United States Patent
Shmuylovich et al.

(10) Patent No.: US 9,026,679 B1
(45) Date of Patent: May 5, 2015

(54) METHODS AND APPARATUS FOR PERSISTING MANAGEMENT INFORMATION CHANGES

(75) Inventors: Samuil Shmuylovich, Framingham, MA (US); Anoop George Ninan, Milford, MA (US); Boris Farizon, Westborough, MA (US); John P. Sheehy, Jr., Braintree, MA (US); Paul Bradley, Macroom (IE)

(73) Assignee: EMC Corporation, Hopkinton, MA (US)

( * ) Notice: Subject to any disclaimer, the term of this patent is extended or adjusted under 35 U.S.C. 154(b) by 2897 days.

(21) Appl. No.: 11/393,110

(22) Filed: Mar. 30, 2006

(51) Int. Cl.
G06F 15/16 (2006.01)
G06F 7/00 (2006.01)
G06F 17/00 (2006.01)
G06F 17/30 (2006.01)

(52) U.S. Cl.
CPC .... *G06F 17/30368* (2013.01); *G06F 17/30377* (2013.01); *G06F 17/30371* (2013.01)

(58) Field of Classification Search
CPC .............. G05F 17/30345; G05F 17/30348; G05F 17/30365; G05F 17/30368; G05F 17/30371; G05F 17/30377; G05F 17/3038
USPC ............... 707/102, 205; 709/203, 219, 247
See application file for complete search history.

(56) References Cited

U.S. PATENT DOCUMENTS

| | | | |
|---|---|---|---|
| 5,418,957 A * | 5/1995 | Narayan | 717/113 |
| 7,233,957 B1 * | 6/2007 | Sheehy et al. | 1/1 |
| 7,328,307 B2 * | 2/2008 | Hoogterp | 711/114 |
| 7,373,520 B1 * | 5/2008 | Borthakur et al. | 713/189 |
| 7,444,350 B1 * | 10/2008 | MacKinnon et al. | 1/1 |
| 7,457,824 B1 * | 11/2008 | Strom et al. | 1/1 |
| 7,493,388 B2 * | 2/2009 | Wen et al. | 709/224 |
| 7,516,145 B2 * | 4/2009 | Sikchi et al. | 1/1 |
| 2001/0020254 A1 * | 9/2001 | Blumenau et al. | 709/229 |
| 2002/0010797 A1 * | 1/2002 | Moulton | 709/247 |
| 2002/0059274 A1 * | 5/2002 | Hartsell et al. | 707/100 |
| 2002/0078292 A1 * | 6/2002 | Chilton | 710/305 |
| 2002/0161771 A1 * | 10/2002 | Boshko | 707/100 |
| 2003/0097481 A1 * | 5/2003 | Richter | 709/251 |
| 2003/0135495 A1 * | 7/2003 | Vagnozzi | 707/3 |
| 2004/0193661 A1 * | 9/2004 | Sikchi et al. | 707/205 |
| 2005/0138306 A1 * | 6/2005 | Panchbudhe et al. | 711/162 |
| 2007/0118709 A1 * | 5/2007 | Tysowski et al. | 711/165 |

* cited by examiner

*Primary Examiner* — Tae Kim
(74) *Attorney, Agent, or Firm* — Krishnendu Gupta; Gerald P. Kazanjian

(57) ABSTRACT

A SAN management agent computes a validator corresponding to a full data set from which a relative (change) data set is derived. The validator, such as a checksum, identifies the full data set to which the relative data set is applicable. The validator is transmitted with the relative data set, and the store process compares the validator with the previous validator stored with the full data set in a database. If the validators correspond (i.e. match), then the received relative data set is applicable to the full data set stored at the database, and the relative data set may be processed as a change set. The remote agent therefore computes the validator on a full data set at a remote node, and transmits the validator with the change set. Subsequent relative data sets may then compare the current validator of the DB data set with the validator from which the relative set was derived.

20 Claims, 10 Drawing Sheets

METHODS AND APPARATUS FOR PERSISTING MANAGEMENT INFORMATION CHANGES

BACKGROUND

In a storage area network (SAN), a SAN management application monitors and manages manageable entities in the SAN. The manageable entities include storage arrays, connectivity devices, and hosts. Typically, software components known as agents execute on the hosts for gathering, reporting, and monitoring the manageable entities in the SAN. The manageable entities are responsive to the agents and report various status metrics back to the agents, and receive control information from the agents. A management server executes the SAN management application, and oversees the agents. The management server also connects to a console having a graphical user interface (GUI) for receiving and displaying operator parameters with a SAN operator.

The SAN is therefore an interconnection of manageable entities operative to provide mass data storage and retrieval services to a user community. In the SAN, various data collection and reporting operations occur. The data collection and reporting operations gather management information about the SAN. The management information is indicative of operating parameters, including but not limited to physical device usage, logical device allocation across physical devices, redundancy usage (mirroring, shadowing and RAID arrangements), available storage, used storage and archive/backup arrangements. Other types and usage of management information is employable by those skilled in the art of SAN management and control.

SUMMARY

In a conventional storage area network, a plurality of agents gather change information concerning manageable entities in the SAN, and transmit the gathered information to a common database. The manageable entities may be, for example, storage arrays operable to receive data modifications from a user community which the SAN serves, and the common database is a managed object (MO) database updated by a set of one or more store processes operable to coordinate updates from the various agents in the SAN. The gathered information typically includes metrics concerning SAN throughput, such as user data written and received from the storage arrays on behalf of the users of the SAN. Accordingly, in a large SAN having many users, the gathered information may be substantial.

Therefore, in a typical SAN, there may be many agents transmitting to multiple store processes responsible for performing concurrent updates to the MO database. Accordingly, different agents may gather information from storage arrays at different times. Further, agents frequently employ change sets for transmitting data set information to a store process. Change sets indicate a set of relative changes to a full set of data, and are often substantially smaller than the corresponding full data set. Change sets are employed to handle sparse updates and avoid time and resource consuming full data sets, as discussed further in copending U.S. patent application Ser. No. 10/675,205, filed Sep. 30, 2003, entitled "METHOD AND APPARATUS FOR IDENTIFYING AND PROCESSING CHANGES TO MANAGEMENT INFORMATION", incorporated herein by reference in entirety. Configurations discussed herein are based, in part, on the observation that multiple agents performing change set processing relative to a full data set may be problematic if change sets (relative sets) correspond to different full data sets. Since the change sets are relative to a previous full data set, change set processing identifies the corresponding full data set to ensure that the changes are consistent. If the changes received by a store process are relative to a different full data set than that currently at the MO database, then the changes maybe invalid.

Accordingly, configurations herein substantially overcome the above describe shortcomings by computing a validator corresponding to a full data set from which a relative (change) data set is derived. The validator, such as a checksum or other integrity verification mechanism, identifies the full data set to which the relative data set is applicable. The validator is transmitted with the relative data set, and the store process compares the validator with the previous validator stored with the full data set at the MO database. If the validators correspond (i.e. match), then the received relative data set is applicable to the full data set stored at the MO database, and the relative data set may be processed as a change set. The remote agent therefore computes the validator on a full data set at a remote node, and transmits the validator with the change set. A new validator corresponding to the now revised (old full data set augmented with the current relative data set) is then stored with the data set. Subsequent relative data sets may then compare the current validator of the MO data set with the validator from which the relative set was derived (corresponds). In this manner, a relative data set, or change set, includes a validator indicative of the full data set from which it was derived, and thus the full data set to which it is applicable. It should be observed that the validator corresponding to a current set becomes the previous validator to which the next set is compared. Thus, the validators are "rolled forward" such that once the previous validator passes the check with respect to the current data set to which the changes apply, a current validator representing those changes then becomes the "previous" validator for the newly revised data set. For this reason, a current and previous validator are transmitted with a data set. If a received relative data set does not have a validator that matches the current validator in the MO database, then the relative data set is not applied and a current full data set is needed.

In further detail, the method for updating a database from a remote node in a storage area network (SAN) includes receiving a change set having changes to a stored dataset, and receiving validators indicative of the data set to which the change set applies. A store process compares the received validators (previous and current) to a previous validator indicative of a present state of the stored data set, and applies, if the received (previous) validator corresponds to the (stored) previous validator, the changes in the change set to the stored data set. Alternatively, the store process does not apply, if the received validator does not correspond to the previous validator, the changes in the change set. The store process may then request a full data set, or may wait a period of time for a change set with a corresponding validator.

Configurations herein compute a validator, such as a checksum, indicative of the data set to which the change set is relative to. Computing the validator includes computing a value specific to at least a subset of selected values in a dataset and operable to substantially distinguish the data set from other data sets having different values. An agent computes a validator on a full data set corresponding to a remote managed object (e.g. storage array) and generates a change set indicative of changes to the previous state of the full data set. The agent then transmits the generated change set and the computed validators to a store process operable to maintain the full data set, and compares the computed (previous) validator to a previous validator corresponding to the previously generated data set (typically the data set resulting from the last applied change set). The receiving store process applies the generated change set if the computed validator corresponds to the validator indicative of the previously generated change set, and stores the computed validator as the "new" previous validator operable for comparison with a successive change set.

For successive change sets, in the exemplary configuration, applying the change set to the stored data set further includes storing the corresponding validator with the stored data set, and receiving a subsequent change set having a subsequent validator, the subsequent validator indicative of a data set to which the subsequent change set applies. The store process compares the subsequent validator to the stored validator; and applies, if the subsequent validator matches the stored validator, the subsequent change set to the stored data set. The agent computes an update validator indicative of the applied change set, and the receiving store process stores the update validator as the current stored validator. Thus, as indicated above, two validators are transmitted with the change set, to facilitate "rolling forward" the sequence of validators. The previous validator, indicative of the data set to which the changes are applicable, should match the validator of the change set at the store process. If the match indicates correspondence, an update validator, indicative of the updated full data set with the change set applied, becomes the previous validator of the store process with respect to successive change sets. Upon receipt of successive change sets, the store process discards, if the subsequent validator does not match the stored validator, the subsequent change set, and requests a full data set be sent from an agent responsible for the remote data set to which the change set applies.

In the exemplary configuration, the method identifies a delta threshold, in which the delta threshold is indicative of a change set size imposing a computational intensity of greater magnitude than a corresponding full set update. The store process processes a full data set inclusive of the changes in the change set if the quantity of changes in the change set exceeds the identified delta threshold. Particular configurations may therefore include transmitting a full data set having marked changes, the marked changes defining a change set, comparing the full data set to a delta threshold indicative of a maximum change set, and determining, based on the comparing, whether to apply the full data set or the marked changes. Change set processing may therefore further include building a full data set, and for each entry in the full data set, marking the entry as changed or unchanged, in which the set of changed entries collectively define a change data set. The agent then transmits the built full data set, and applies, based on the comparing, at least one of the 1) change set defined by the marked changed entries, or 2) the full data set having all entries.

Further configurations identify a partition threshold, including computing, if the quantity of changes exceeds the partition threshold, a series of partitions, in which each of the partitions is inclusive of related data items. The related data items correspond to common objects, such that the common objects comprise common updates for a plurality of changes in the data set. Agents then transmit each of the partitions, such that transmitting further includes computing a plurality of partitions inclusive of the entire data set, and transmitting each of the partitions. Partitioning is discussed further in copending U.S. patent application Ser. No. 11/095,421, filed Mar. 31, 2005, entitled "METHOD AND APPARATUS FOR PROCESSING MANAGEMENT INFORMATION", incorporated herein by reference in entirety. The full data set therefore includes a series of partitions, such that computing the validator further includes computing the validator on the aggregate partitions, identifying a stored validator from a previous data set, and receiving each of the partitions in the full data set.

In particular configurations, generating the change set occurs according to a data collection policy, in which the data collection policy is indicative of time intervals for generating change sets. The data collection policy may further define the time interval as a multiple of a time interval corresponding to other agents.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations herein present SAN environments having many agents transmitting to multiple store processes responsible for performing concurrent updates to the managed object (MO) database or other persistent data store. Therefore, different agents may gather information from storage arrays at different times. Further, as noted above, change sets are employed to handle sparse updates and avoid time and resource consuming full data set processing. Configurations discussed herein are based, in part, on the observation that multiple agents performing change set processing relative to a full data set may be problematic if change sets (relative sets) correspond to different full data sets. Since the change sets are relative to a previous full data set, change set processing identifies the corresponding full data set to ensure that the changes are consistent. If the changes received by a store process are relative to a different full data set than that currently at the MO database, the changes maybe invalid.

Accordingly, exemplary configurations herein substantially overcome the above described shortcomings by computing a validator corresponding to a full data set from which a relative (change) data set is derived. The validator identifies the full data set to which the relative data set is applicable. The validator is transmitted with the relative data set, and the store process compares the validator with a previous validator corresponding to the full data set residing at the MO database. If the validators correspond (i.e. match), then the received relative data set is applicable to the full data set stored at the MO database, and the relative data set may be processed as a change set. The remote agent therefore computes the validator on a full data set at a remote node, and transmits the validator with the change set. A new validator corresponding to the now revised data set (old full data set augmented with the current relative data set) is then stored with the data set. Subsequent relative data sets may then compare the current validator of the MO data set with the validator from which the relative set was derived (corresponds). In this manner, a relative data set, or change set, includes a validator indicative of the full data set from which it was derived, and thus the full data set to which it is applicable. If a received relative data set does not have a validator that matches the current validator in the MO database, then the relative set is not applied and a current full data set is needed. Such validators are a mathematical integrity verification mechanism computed or derived from the data they represent or from a selected subset thereof, such as a particular field. Exemplary validators include checksums, authenticators derived from cryptographic functions, and hashes, as are known in the art. Alternate arrangements of such validators will therefore be apparent to those of skill in the art.

Figure 1:
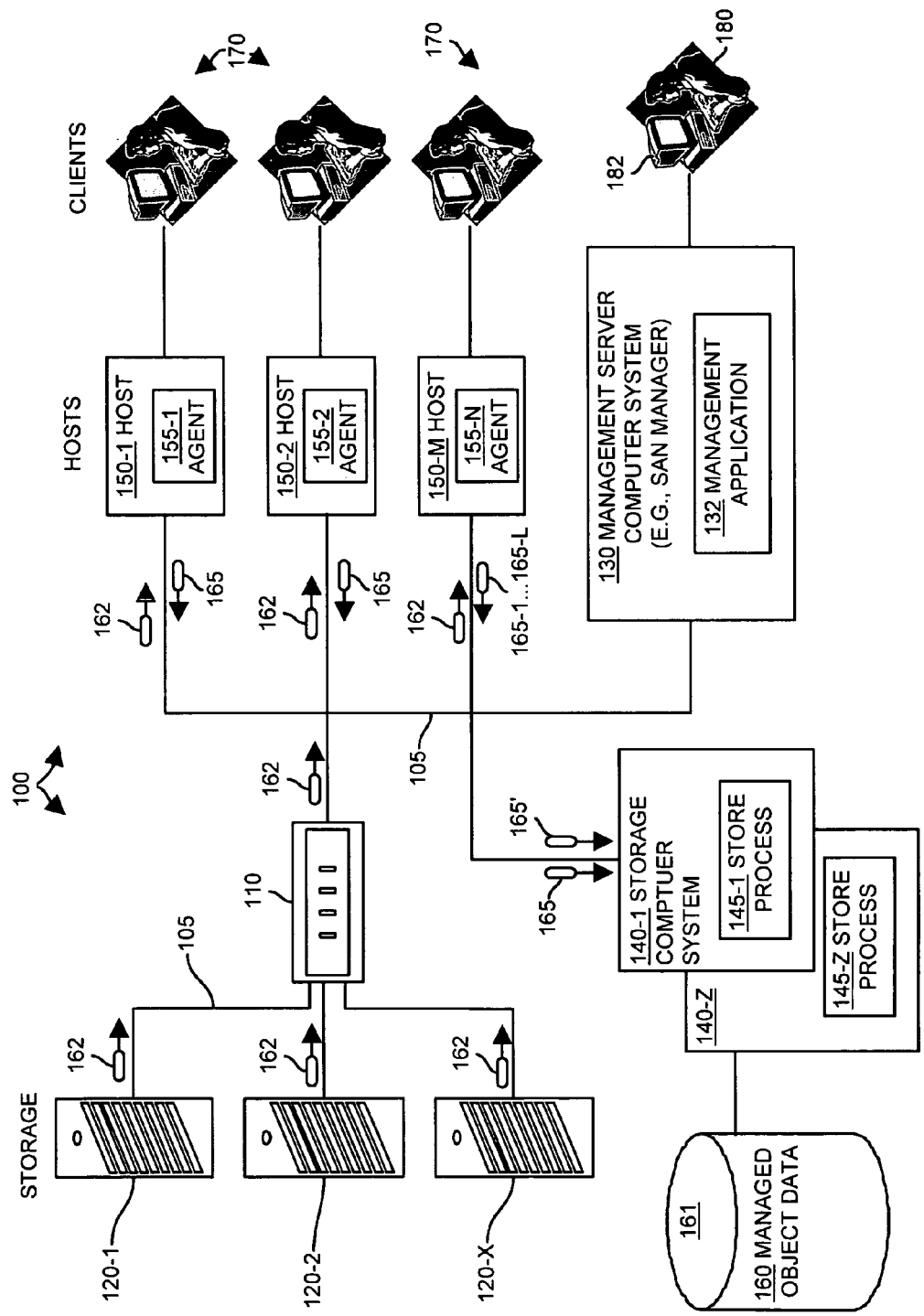
FIG. 1 is a context diagram of an exemplary managed information environment suitable for use with the present invention.

FIG. 1 is a context diagram of an exemplary managed information environment suitable for use with the present invention. FIG. 1 illustrates an example of a networking environment suitable for use in explaining example embodiments of the invention. In this example, the networking environment is a storage area network 100 that includes a communications medium 105 interconnecting a plurality of data storage systems 120-1 through 120-X through one or more connectivity devices 120-Y (e.g., storage area network switches) to a plurality of host computer systems 150-1 through 150-M. According to the general operation of the network shown in FIG. 1, client computer systems 170 can operate various client software applications (not specifically shown) that communicate with server applications (not specifically shown) operating within the host computer systems 150 in order to access data stored within the data storage systems 120 over the storage area network 100.

The storage area network 100 includes a management server computer system 130 that operates a network management application 132. In addition, the storage area network 100 includes one or more storage computer systems 140-1 through 140-Z that operate respective store processes 145-1 through 145-Z configured as disclosed herein. A plurality of agent software processes 155-1 through 155-N operate within one or more of the host computer systems 150-1 through 150-M as further defined herein. Generally, the agents 155 and store processes 145 interoperate with, and are collectively considered parts of the network management application 132. A network administrator 180 (i.e., a person) interacts via a console computer system 182 with the management application 132 executing on the management server computer system 130 in order to remotely administer manageable resources 120 within the storage area network 100 such as the data storage systems 120-1 through 120-X, the connectivity devices 120-Y and the host computer systems 150. The data storage systems 150 send management data 162, such as data sets, to the agents 155. The agents subsequently send full 165 and relative 165' (change) data sets, which may include partitioned data sets 165-1 . . . 165-L. Details of agent and store processing as explained herein will now be provided with respect to FIG. 2 and flow charts of processing steps that follow.

Figure 2:
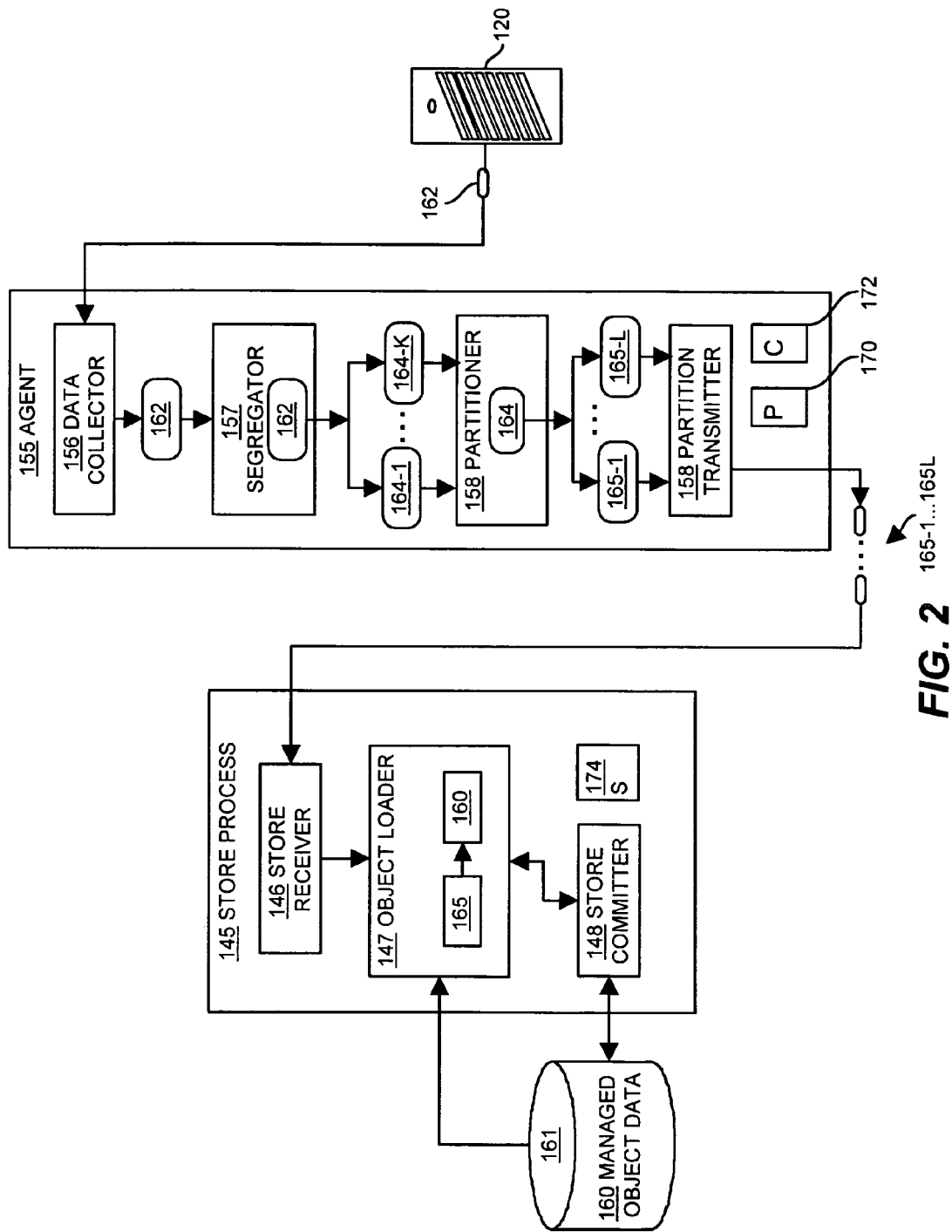
FIG. 2 illustrates an example configuration of an agent and a store process in accordance with a particular exemplary embodiment used illustratively herein.

FIG. 2 illustrates an example configuration of an agent 155 and a store process 145 in accordance with a particular exemplary embodiment used illustratively herein. The example in FIG. 2 illustrates a single agent 155 interacting with a single store process 145, though as shown in FIG. 1, there can be many agents 150 and store processes 145 operational at the same time in the network 100. The agent 155 includes, in this example, a number of software components including a data collector 156, a data segregator 157, a partitioner 158 and a partition transmitter 159. The store process 145 includes, in this example, a store receiver 146, an object loader 147 and a store committer 148. The store process 145 interfaces with a managed object database 161 and maintains managed objects 160 (i.e., managed object data). The store process 145 also maintains a validator 174 indicative of a current data set 160 of managed object data stored in the database 162, discussed further below. The example configuration illustrated in FIGS. 1 and 2 will be used to provide a description of operations of embodiments disclosed herein in conjunction with flow charts of processing steps performed by an agent 155 and store process 145.

Configurations disclosed herein generally relate to the processing performed by the agents 155 and the store processes 145 to collect management data sets 162 from managed resources 120 for placement into the management database 160 for access by the management application 132. Generally, an agent 155 collects a management data set 162 from a managed resource 120 and performs as explained herein to segregate the management data set 162 into segregated regions 164-1 through 164-K. In one configuration, each segregated region 164 includes management data collected from the resource for a group of related objects maintained by the store processes 145 within the management object data 160. By related objects, what is meant in one configuration is that the management data selected by an agent 155 for inclusion into a specific segregated region 164 is management data that maintains relationships between objects and references to other objects, in an object model of the managed object data 160, that are related to an object corresponding to that particular portion of management data, as defined in a model containment hierarchy for that object in the object model 160, and those relationships are constructible from portions of management data included in that segregated region 164. Stated differently, data in a segregated region 164 represents a partial transitive closure of data from the management data set 162, discussed further in the copending application cited above (application Ser. No. 11/095,421). In one configuration, the collection of segregated regions 164-1 through 164-K includes all of the data from the management data set 162.

After identifying the data for various segregated regions 164, the agent 155 breaks the segregated regions 164 up into logical partitions 165-1 through 165-L and transfers each logical partition 165 to a store process 145. By sending the data in partitions 165, the processing burden on each store process 145 is minimized since the store processes 145 only instantiates, from the managed object database 161, those managed object 160 that need to be populated with data from the current partition(s) 165 being processed. In other words, since the partitions 165 contain data for a much smaller group of objects 160 than the entire collected management data set 162, the store process 145 does not have to process the entire management data set 162 at one time. Rather, using the system explained herein, the store process 145 processes partitions 165 of management data as they are received and as a result, the store processes 145 consume less memory and processor cycles processing the management data partition by partition.

Figure 3:
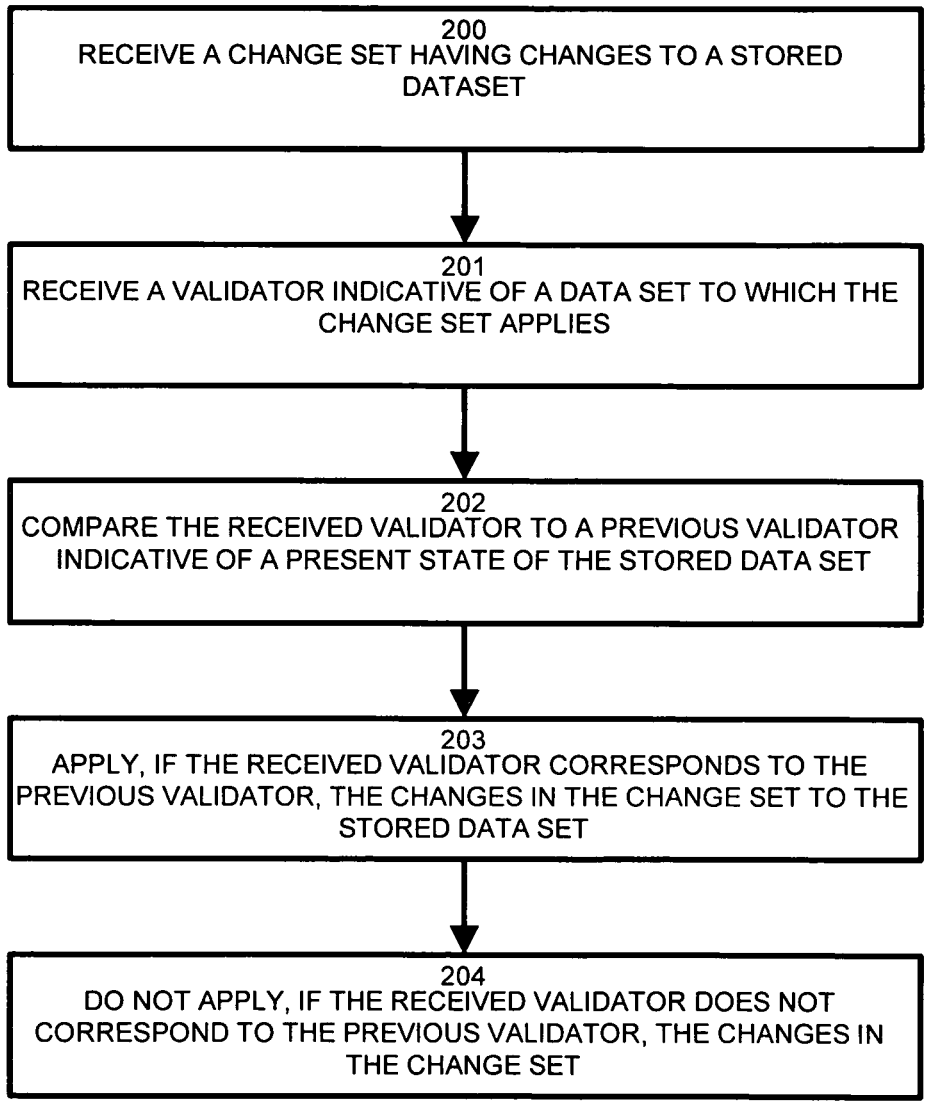
FIG. 3 is a flowchart of database change set processing in the environment of FIG. 1.

FIG. 3 is a flowchart of database 161 change set processing in the environment of FIG. 1. Referring to FIG. 3, the method for updating a database 161 from a remote node (host) 150 in a storage area network (SAN) as disclosed herein includes, at step 200, receiving a change set 165' having changes to a stored data set, and receiving a validator indicative of a data set to which the change set applies, as depicted at step 201. The validator is a mathematical quantity such as a checksum indicative of the content of the stored data set and operable for comparison to identify a similar data set. The store process 145 receiving the data set compares the received validator to a previous validator 174 indicative of a present state of the stored data set, as shown at step 202. The store process 145 maintains the validator corresponding to previous data sets received and applied to the managed object database 160. Therefore, the comparison indicates whether the change set is relative to the current version of the stored data set at the managed object database 160. The store process 145 applies, if the received validator corresponds to the previous validator 174, the changes in the change set 165' to the stored data set 160, as depicted at step 203. If the validators match, indicating that the change set was taken from a data set with which the store process 145 is current, the change set is applicable to the data set 160 at the managed object database 161. Otherwise, at step 204, the store process 145 does not apply, if the received validator does not correspond to the previous validator 174, the changes in the change set. Alternatively, the store process 145 may flag the ordering and/or may request that a full data set be sent, however the received change set 165' is not applied to the current full data set 160 in the managed object database 161.

Figure 4:
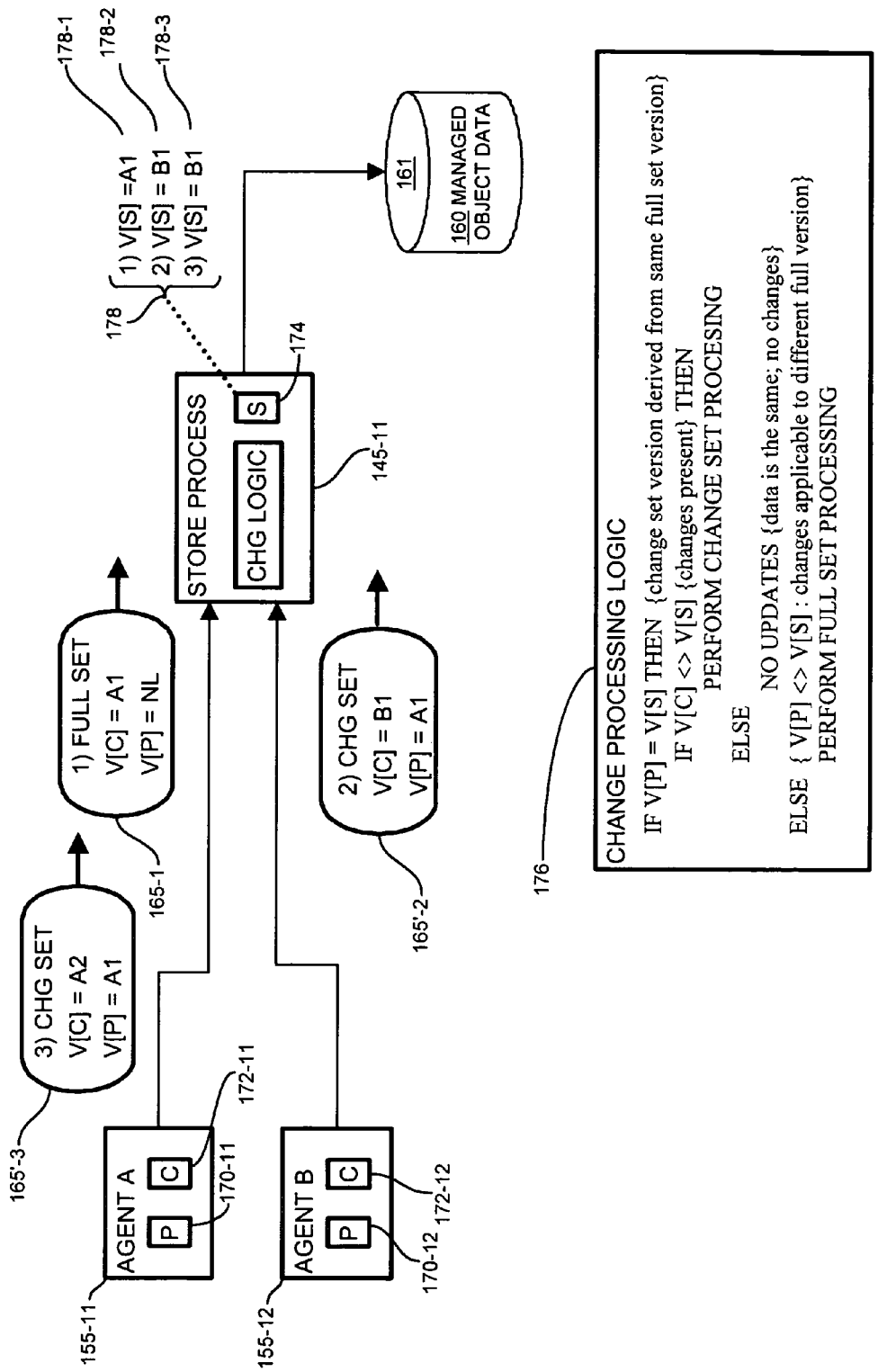
FIG. 4 is a data flow diagram of change set processing in the environment of FIGS. 1 and 2.

FIG. 4 is a data flow diagram of change set processing in the environment of FIGS. 1 and 2. Referring to FIGS. 1-3, agents A and B 155-11, 155-12 respectively send change set data 165 to store process 145-11. Each agent 155 has a current validator V[C] 170-11 . . . 170-22 (170 generally), and a previous validator V[P] 172-11 . . . 172-12 (172 generally). Each store process 145-11 (145 generally) has a database, or store, validator 174 (V[S]) corresponding to the set of data currently stored. In the exemplary configuration, the validator 174 is an authenticating value corresponding to the data set 160 currently stored at the managed object database 161. Alternatively, the store validator 174 may be stored and fetched from the managed object database 161 by any of the store processes 145.

As indicated above, change sets 165' are relative data sets indicative selecting changes to a data set 162. Change sets are applicable to a particular complete data set 162 from which they were derived at the storage array 120. Accordingly, change sets 165' generated by an agent 155 in relation to a full set are applicable to a similar full set at the managed object database 161. In each of the agents 155, the previous validator 170 corresponds to the data set to which the current data set is relative to (i.e. may be applied to). The current validator 172 represents the full set 160 after application of the current change set 165'. As will be discussed below, the current validator 172 replaces the previous validator 174 after application of the change set, thus "rolling forward" the set of changes in the MO database 161, so that successive change sets may be applied before a full set is needed. Accordingly, the store validator 174 (validator) corresponds to the current data set stored in the MO database 161. Thus, the store process 174 may compare validators 170, 174 to verify that a received change set is relative to the same data set 160 currently stored in the MO database 161. In this manner, change sets 165' derived at a different time by different agents 145, and thus applicable to a different data set 162, are identifiable at the store process as not applicable to the current data set 160 in the managed object database 161.

Referring to the exemplary set of messages 165-1 . . . 165'-3 in FIG. 3, agents A 155-11 and B 155-12 send data set updates 165 to the store process 145-11. Agent A 155-11 sends a full data set 165-1 as a first message having a current validator V[C] of A1 to the store process 145-11. Since this is a first full set, there is a null (NL) previous validator V[P] 170. Even though the validators 170, 172 are typically employed in change set processing, validators are still sent with full data sets. The previous validator 170 may be useful in full set processing for items such as duplicate identification, as when the store process has already received the full set from another agent, for example. The store process 145-11 retains a validator value V[S] 174 of A1, as indicated by table 178 entry 178-1, after message 165-1. Subsequently, agent B 155-12 gathers a change set based on the A1 set of data, and sends a change set message 165'-2 to the store process 145-11. The change set message 165'-2 is relative to the previous full data set A1, and thus has a previous validator 170 of V[P]=A1. The change set 165'-2 also has a current validator 172 V[C] of B1, corresponding to the gathered current set after being applied to data set A1. Upon receipt by the store process 145-11, the store process 145-11 performs change set processing according to change processing logic 176. Since the previous change set 170 V[P] from which the change set 165'-2 was derived (A1) is the same as the store validator V[S] 174, the change set 165-2 is properly applicable to the data set 160 at the managed object database 161. In the exemplary configuration, change processing logic 176 is as follows:

IF V[P]=V[S] THEN {change set version derived from same full set version}
  IF V[C]≠V[S] {changes present} THEN
    PERFORM CHANGE SET PROCESSING
  ELSE
    NO UPDATES {data is the same; no changes}
ELSE {V[P]≠V[S]: changes applicable to different full version}
  PERFORM FULL SET PROCESSING Applying the change processing logic 176 the store process 145-11 determines that the change set 165'-2 was based on the same full data set A1 as that stored in the database 161, sent in the previous message 165-1, as indicated by the store validator 174. After the change set 165'-2 is applied, the store validator 174 receives the value of the current validator 172 V[C]=B1, as indicted by store validator values entry 178-2.

At still a later time, agent A 155-11 sends a third message 165'-3. The change set in 165-3, however, was based on the previous full data set A1 sent by agent A 164-11. Accordingly upon receipt at the store process 145-11, change processing logic 176 compares the previous validator 170 of V[P]=A1 to the store process validator 174 of V[S]=B1, and detects a mismatch. Thus, agent A 155-11 needs to perform full processing to bring the store process data set version 174 into synchronization. Store process 145-11 values 178 remain at B1 (178-3) after receiving message 165'-3.

Note that while the exemplary configuration employ a checksum as a mechanism of authenticating data sets, other mechanisms for computing a validator indicative of a data set may be employed. For example, various hashing and/or summing operations, such as MD4, MD5 and others known to those of skill in the art, may be employed in alternate configurations.

Figure 5:
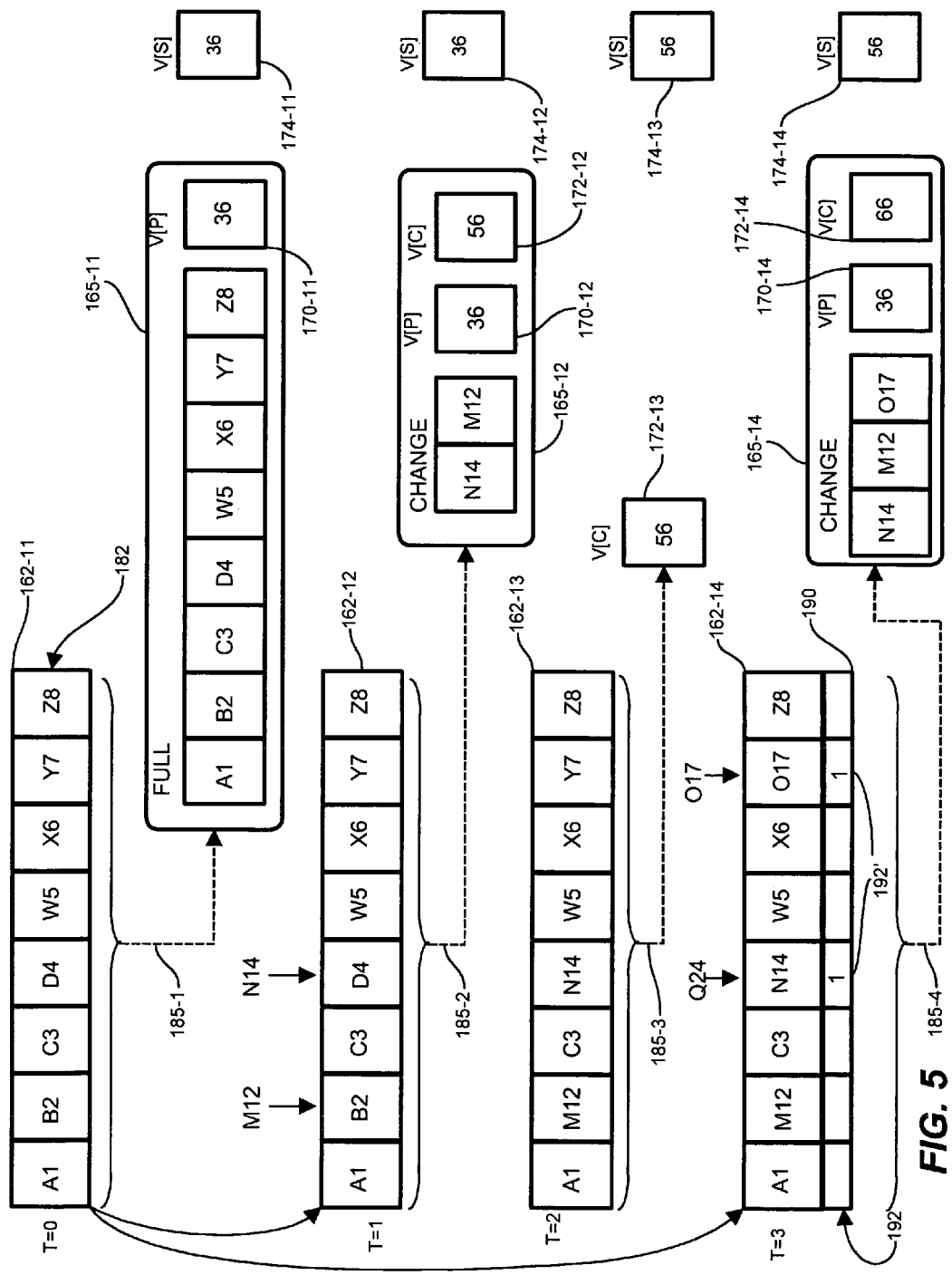
FIG. 5 is a block diagram of change set processing employing the data flow of FIG. 3.
Figure 6:
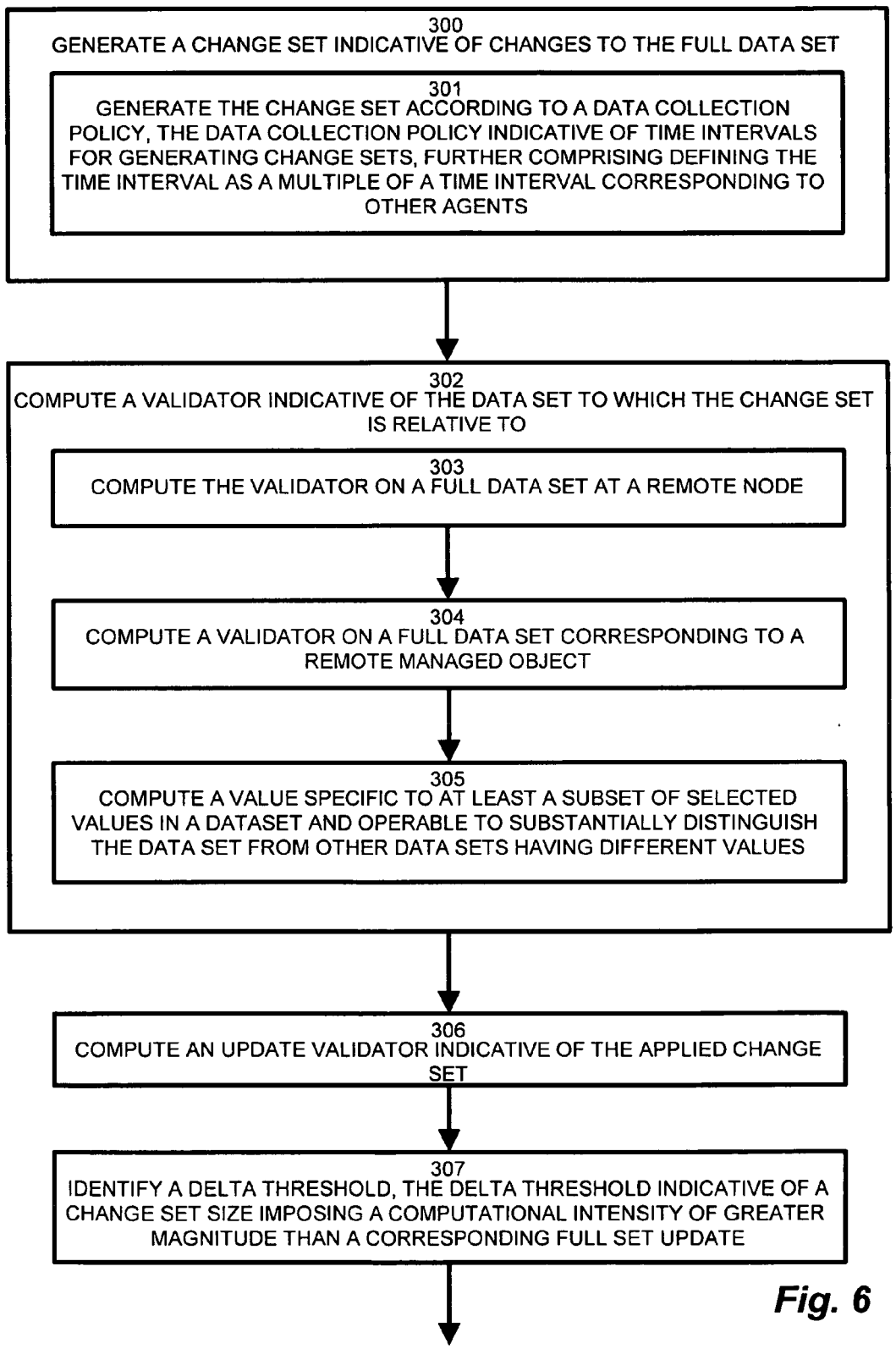
FIGS. 6-10 are a flowchart of database change processing in the exemplary environment of FIGS. 4 and 5 in greater detail.
Figure 7:
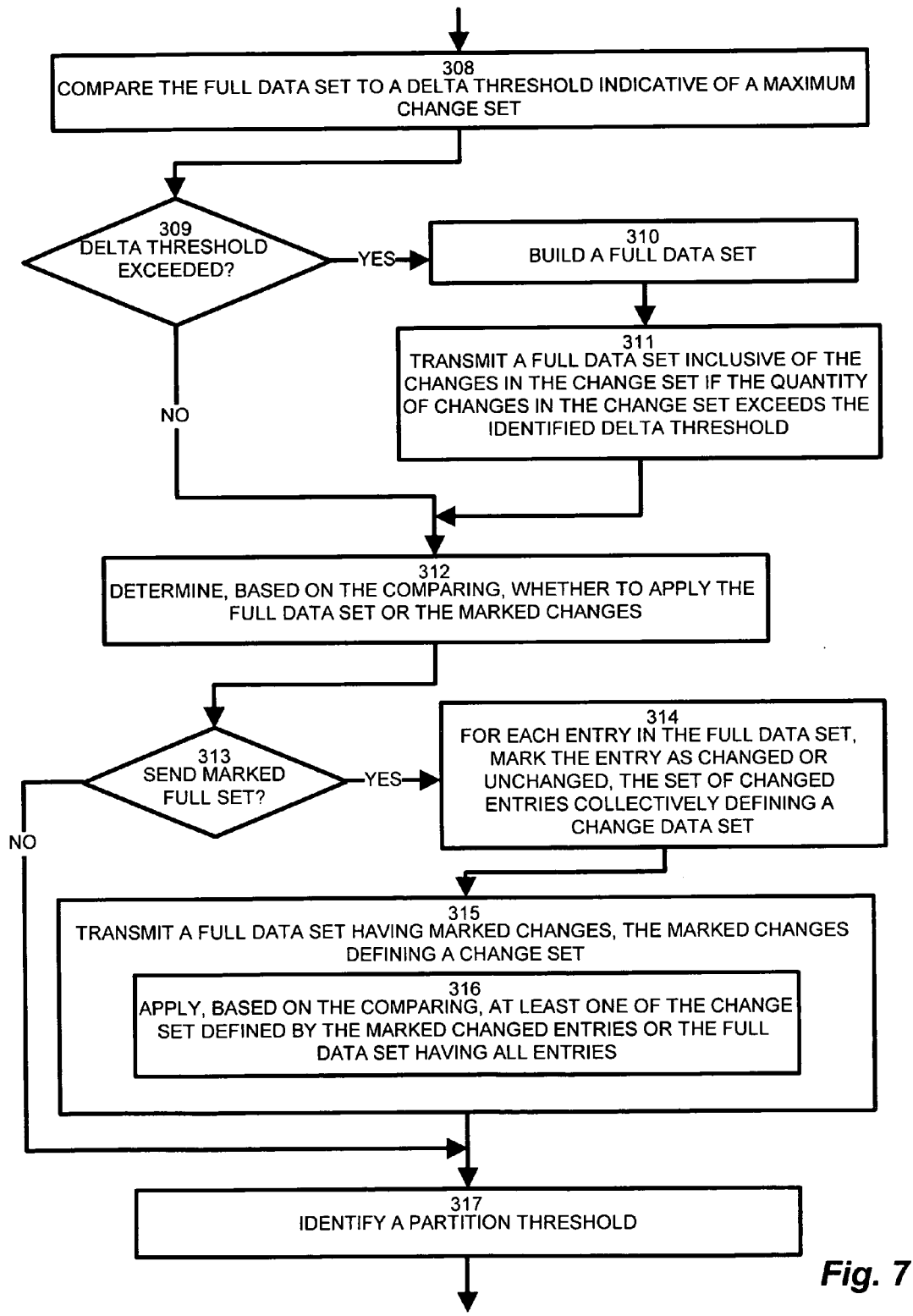
Figure 8:
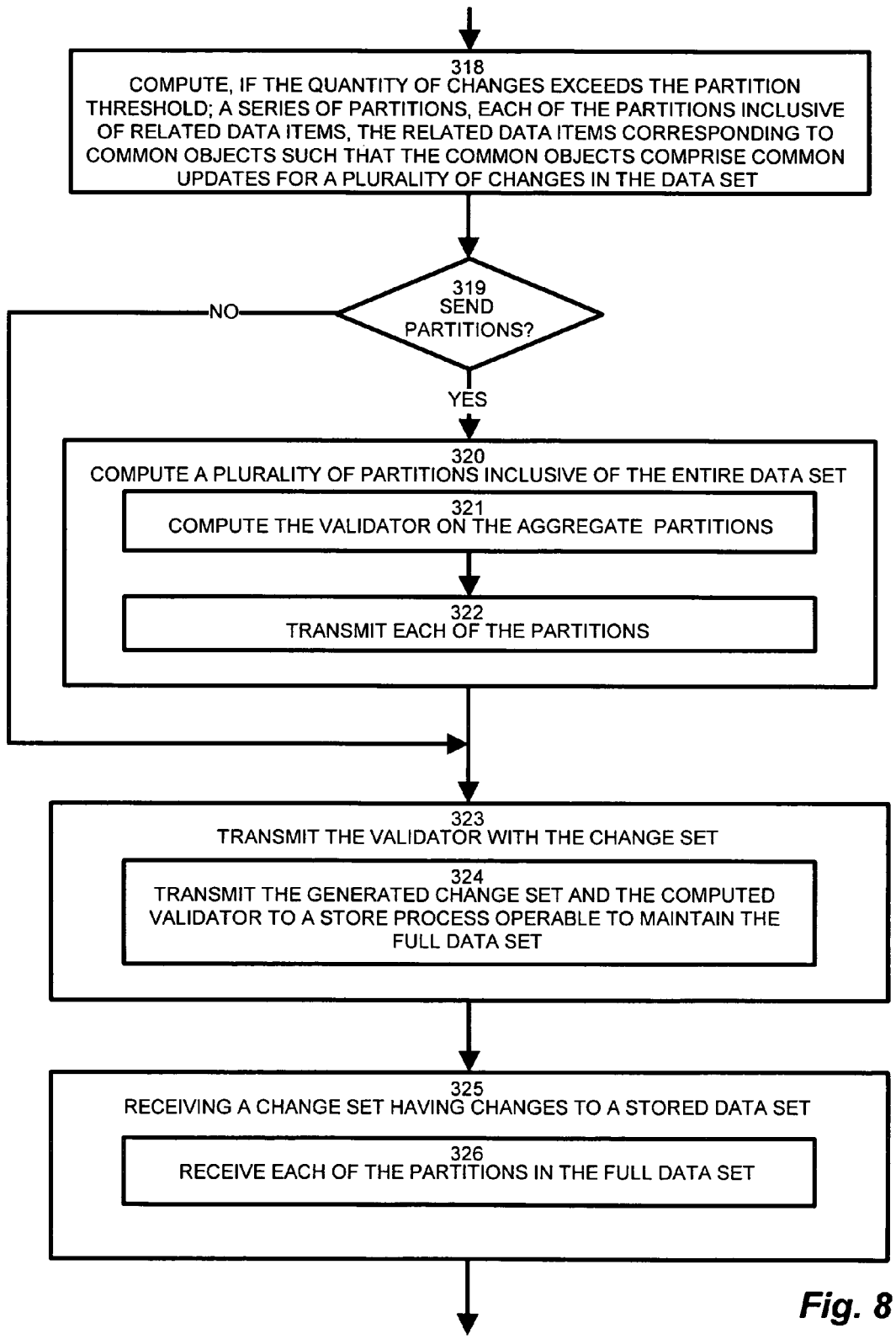
Figure 9:
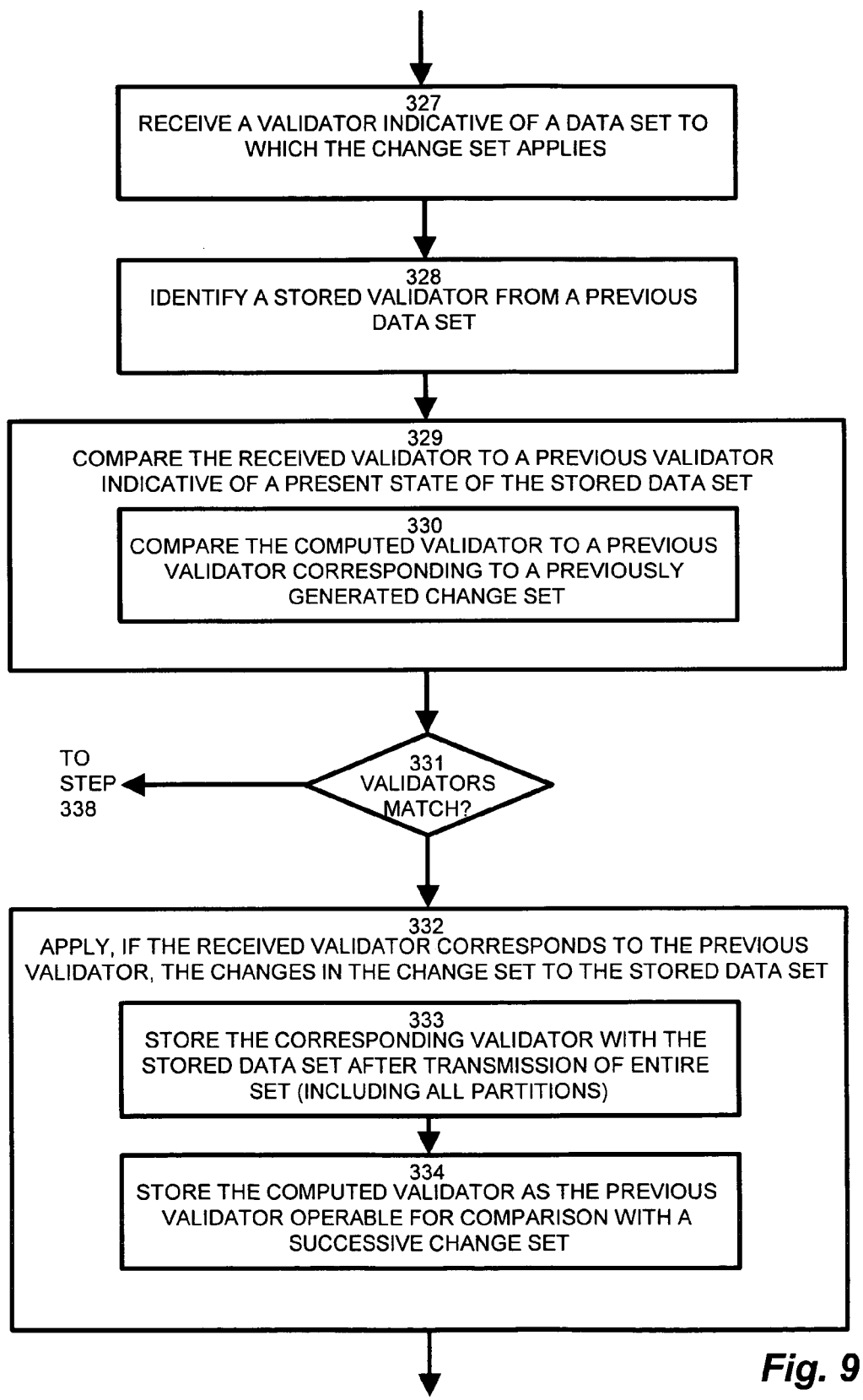
Figure 10:
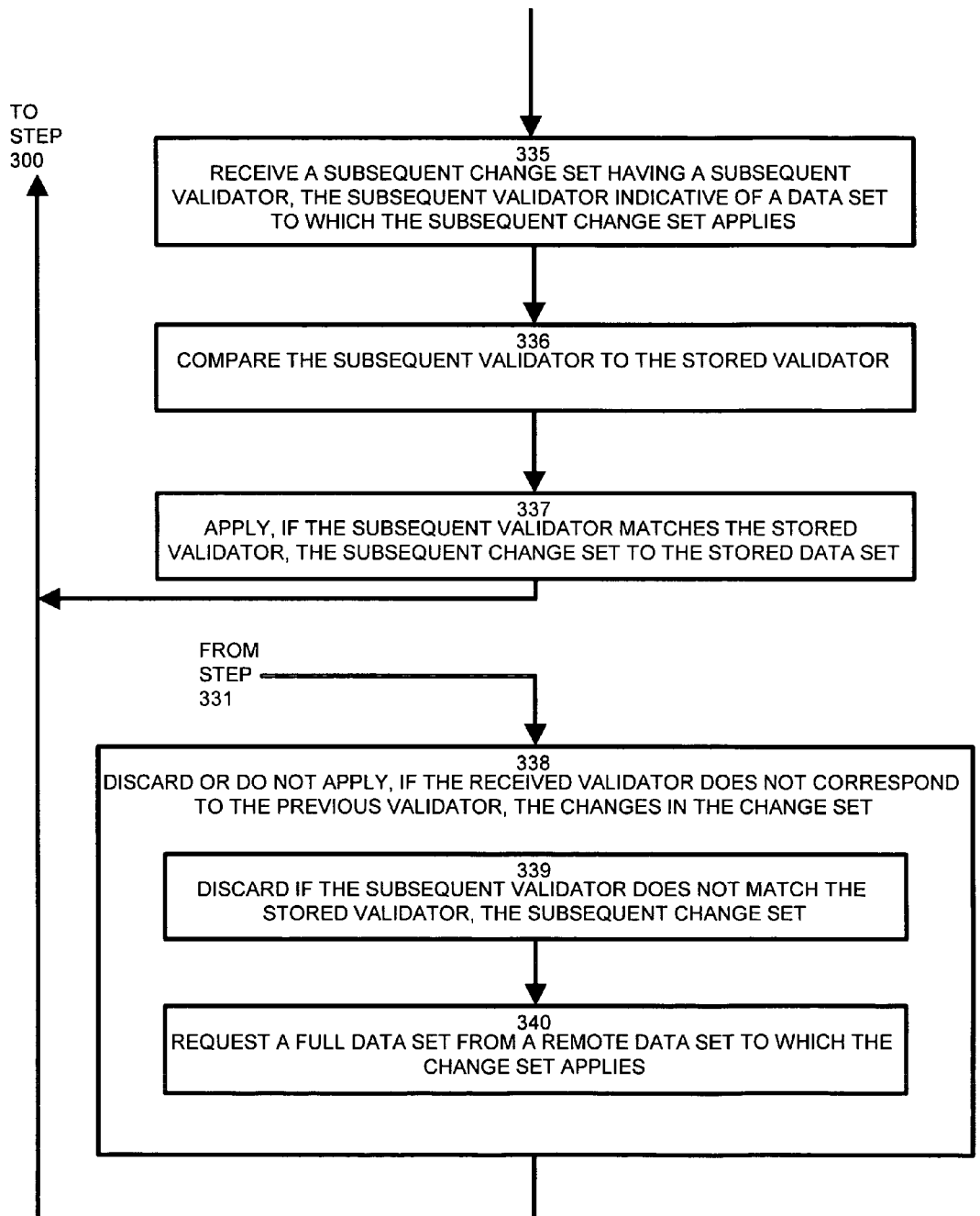

FIG. 5 is a block diagram of change set 165' processing. Referring to FIGS. 3 and 4, a sequence of data sets 165-1 . . . 165-4 is shown, at times T=0 . . . T=3, respectively along with corresponding messages 165-11 . . . 165-13. Message 165-11 is a full change set message, and messages 165'-12 and 165'-14 are change set (relative) messages. Data set information 162-11 . . . 162-14 is representative of a storage array 120 from which the agents 155 gather data. Each of the data sets 165 has an exemplary quantity of records 182 for illustrative purposes. In relation to actual storage arrays 120, the number of records tends to become substantially large, such that full data sets 165 require substantial resources and change data sets 165', while large, represent a substantial savings over full set processing. At time T=0, the data set 165-1 has records 182 corresponding to a validator of 36 (computed in an exemplary manner by adding the numerical label of each record 182). The agent 155 generates a full data set as message 165-11 having records 182 from A1-Z8, and a store validator V[S] 174-11 of 36. The agent 155 stores this as previous validator 170 V[P]=36, as shown by arrow 185-11. No previous validator 170 is written to the message 165-11 because the message 165-11 represents a full set.

At time T=1, changes writing records M12 and N14 are made to B2 and D4, respectively. The agent 155 computes the new current validator 172 to be V[C]=56. Accordingly, the agent 155 generates change data set 165-12 with the change records N14 and M12, along with previous validator 170-12 V[P]=36 (shown by arrow 185-12) and current validator 172-12 V[C]=56. Upon receipt, the store process 145 compares the store validator 174-12 V[S]=36, and finds that it matches the previous validator 174-11 from which the change set was generated. Accordingly, the change set records N14 and M12 are processed, and the store validator 174 updated to 56 from the current validator V[C] of the message 165-12. At time T=2, therefore, the storage array 120 has data set as shown in 162-13, represented by a validator 170 of 56, and the store process 145 maintains a validator 174-13 V[S] of 56 as indicative of the most recent update, as shown by arrow 185-13.

At time T=3, another data set 162-14, possibly from a different agent 155, generates a change set 165'-14 relative to T=0, as shown by arrow 185-14. Updates O17 and Q24 have recently occurred. Accordingly, the data set 162-14 corresponds to a current validator 172-14 of 66, and retains 36 as the previous validator 170-14 V[P]=36 to which the updates apply. The agent 155 generates change message 165-14, having the O17 and Q24 updates, as well as previous validator V[P]=36 and current validator V[C]=66, shown by arrow 185-14. Accordingly, upon receipt, the store process 145 compares the previous validator 170-14 of V[P]=36 to the store validator 174-14 of V[S]=56 and determines that the change set 165-14 is relative to a data set which is stale with respect to the data set 162-13 currently maintained by the store process. Therefore, the change set 165-13 is not applicable to the store data set and a full data set 165 should be requested.

FIG. 5 also illustrates another configuration in which a change set 165' is defined, or built, as a full set 165 with changes marked. This configuration allows the store process 145 to employ the change processing logic 176 to determine whether change set or full set processing is appropriate, and then operate on the already transmitted data set without requesting a full data set if that is the computed processing approach. A change attribute 190 is associated to each entry in the full data set, shown in the exemplary full data set 162-14. The change attribute 192 indicates each entry that is a change entry operable for change set processing, shown by entries 192'. The full data set 162-14 is transmitted, so that either change set or full set processing is employable by examining the change attribute 192.

In particular configurations, the agents 155 operate according to a data collection policy. The data collection policy indicates the frequency with which the agents 155 gather and process the information for the data sets 165 for transmission to the store process 145. In the example shown above, multiple agents having different data collection policies is one mechanism by which agents 155 might generate change sets 165' relative to different full data sets 160, thus resulting in the exemplary scenario above in which a change set 165' is not relative to the most recent data set seen by the store process 145 to which it is transmitted. Certain configurations may mitigate this possibility by defining data collection policies of different agents 155 as a common multiple of time. For example, one particular agent 155 may gather data every two hours and another may gather data every 10 hours. Therefore, the 10 hour iterations occur concurrently every 5 iterations of the 2 hour cycle. Alternate configurations may implement other data collection policies as appropriate to the needs of the storage area network.

FIGS. 6-10 are a flowchart of database change processing in greater detail. Referring to FIGS. 4-10, at step 300, the method for updating a database 161 from a remote node 120 in a storage area network (SAN) 100 as defined herein includes generating a change set 165 indicative of changes to a full data set 162 in a manageable entity 120. In the SAN environment 100 the data sets include change sets 165' and full data sets 165, in which the change sets 165' are relative to a full data set 165 and indicative of changes to the full data set 165. Since the change set is usually of a smaller size than the full data set, change set processing is desirable because it involves fewer records.

In a typical SAN, generating the change set 165 occurs according to a data collection policy, in which the data collection policy is indicative of time intervals for generating change sets 165'. In the exemplary arrangement, the data collection policy defines the time interval as a multiple of a time interval corresponding to other agents 155, so that the agents 155 report at substantially the same time or at multiples of times as other agents, as shown at step 301.

Change set processing includes computing a validator 170, 172, 174 indicative of the data set to which the change set 165' is relative to, as depicted at step 302. In the exemplary configuration, the validator 170 is a checksum corresponding to the full data set 165 from which the changes were derived. Thus, the change set 165' is applicable to a full data set 165 having the same validator. If the data sets 160 at the managed object database 161 contain a different data set due to more recent updates, then the validator of the managed object database 161, maintained by the store process 145, will differ from the validator 170 of a change set 165'. Accordingly, the agent 155 receiving data from a storage array (managed object) 120 computes the validator 170 on a full data set 162 at a remote node 120 as depicted at step 303. In the exemplary environment 100, this involves computing the validator 170 on a full data set corresponding to a remote managed object (storage array 120), as shown at step 304. Computing the validator 170 further includes computing a value specific to at least a subset of selected values in a dataset 162 and operable to substantially distinguish the data set from other data sets having different values, as depicted at step 305. The computed validator will therefore differ when computed over a different set from which changes are derived.

After computing the validator 170 relative to the data set to which the changes apply, the agent 155 also computes an update validator 172 indicative of the applied change set, as depicted at step 306. The update validator 172 is the checksum value after the change set 165' is applied to the corresponding data set 160, and is used to support a series of change sets 165' received at the store process 145. Therefore, the update validator 172 becomes the new checksum value 174 of the store process 145 once the store process applies the updates from the current change set 165'.

The agent 155 also identifies a delta threshold, in which the delta threshold is indicative of a change set size imposing a computational intensity of greater magnitude than a corresponding full set update, as depicted at step 307. As indicated above, generally change set processing affects only a small portion of the total data set. Accordingly, while change set updates require random retrieval and rewrite of records entries, the number of updates is substantially smaller that it is more efficient than the sequential manner of a full update. Occasionally, however, if there are a large number of change set records, it may be more efficient to simply perform full data set processing, since the sequential nature of updates are faster per update. The delta threshold indicates the point at which the number of change set 165' entries outweighs the benefit of change set 165' processing over full data set 165 processing. Accordingly, a check is performed to compare the full data set to a delta threshold indicative of a maximum change set, as depicted at step 308. If the delta threshold is exceeded, as shown at step 309, then the agent 155 builds a full data set, as depicted at step 310. Typically, the agent performs the delta threshold check prior to transmission, however the store process 145, in alternate configurations, may perform the check, and either request a full data set 165 or receive a full data set marked with change set entries, discussed further below. Based on the check at step 309, the agent 155 transmits a full data set 165 inclusive of the changes in the change set 165' if the quantity of changes in the change set exceeds the identified delta threshold, as depicted at step 311.

In particular configurations, the agent 155 may generate a full set marked with specific entries tagged as the change set. If the store process 145 subsequently identifies a need for a full set 165, the agent 155 need not regenerate the full set 165 as it has already been transmitted to the agent 155. The agent 155 determines whether the store process 145 may apply the full data set 165 or the marked changes, as shown at step 312. A check is performed, at step 313, of whether to send a marked full set. If so, then for each entry in the full data set, the agent 155 marks the entry as changed or unchanged, such that the set of changed entries collectively defines a change data set 165', as depicted at step 314. Change set processing may then occur, nonetheless, by processing only tagged records, while full set processing entails the entire transmitted data set 165. Accordingly, the agent transmits a full data set having marked changes, such that the marked changes defining a change set, as shown at step 315. The receiving store process 145 applies at least one of the a) change set 165' defined by the marked changed entries or b) the full data set 165 having all entries, as depicted at step 316.

As indicated above, data sets 165 may be subdivided into partitions to facilitate load sharing and avoid a backlog of data set entries at the store process. The agent 145 identifies a partition threshold, as shown at step 317. The partition threshold indicates an optimal or near optimal subdivision of data set records for a single transmission from the agent 155 to the store process 145. The agent 155 computes if the quantity of changes exceeds the partition threshold, a series of partitions, in which each of the partitions is inclusive of related data items, such that the related data items corresponding to common objects such that the common objects comprise common updates for a plurality of changes in the data set, as depicted at step 318. The partitions may be selected by a partial transitive closure of the set of records affected by a group of changes, thus minimizing the redundant writes to commonly affected records in the managed object database. Further details on partition computation may be found in copending U.S. patent application Ser. No. 11/095,421, cited above.

A check is performed, based on the computations at step 318, on whether to send the data set 165 as a series of partitions. If so, then the agent 155 computes a plurality of partitions 165-1 . . . 165-L inclusive of the entire data set 165, as depicted at step 320. The data set 165 therefore includes a series of partitions 165-N, such that each of the partitions represents a subset of the data set. Accordingly, the data set 165 for transmission further comprises a series of partitions 165-N, such that computing the validator 170 further comprises computing the validator on the aggregate partitions, as disclosed at step 321. The validator 170 is therefore computed on the entire data set collectively, rather than individual partitions, resulting in a single validator 170 for the series of partitions, in the exemplary configuration. The agent 155 then transmits each of the partitions 165 to the requesting store process 145, as depicted at step 322. The agent 155 transmits the validator 172 with the change set, indicative of the changes, and also the previous validator 170 to which the changes are relevant, as shown at step 323. Transmitting therefore includes transmitting the generated change set and the computed validator 172 to a store process 145 operable to maintain the full data set, as shown at step 324.

The store process 145 receives the change set 165' having changes to a stored dataset, as depicted at step 325. Alternatively, the store process 145 may receive a full set including the changes, as outlined above. If the data set 165 was partitioned, the agent 145 receives each of the partitions in the data set, as shown at step 326. Partitioning is based on the size of the data set, rather than whether it is a full data set 162 or change set 165.

At step 327, the store process 145 receives the validator 170 indicative of the data set 160 to which the change set 165 applies. The store process 145 identifies or retrieves the stored validator 174 from a previous data set, as depicted at step 328.

The store process 145 comparing the received validator 170 (V[P]) to the store validator 174 (V[S] indicative of a present state of the stored data set in the managed object database 160, as shown at step 329. Thus, the store process 145 compares the validator 170 (V[P]) to a previous validator 174 (V[S]) corresponding to a previously generated change set 165' or full set 165, as shown at step 330. A check is performed to determine if the validators match, as shown at step 331. Responsively, the receiving store process 145 applies, if the received validator 170 corresponds to the previous validator 174, the changes in the change set 165' to the stored data set 160, as depicted at step 332. Applying the change set 165' to the stored data set 160 further comprises storing the corresponding validator 172 with the stored data set, as depicted at step 333. To enable future data sets, the store process stores the update validator 172 indicative of the data set after applying the changes as the current stored validator 174. Therefore, the store process stores the computed validator V[C] 172 as the previous validator V[S] 174 operable for comparison with a successive change set, as shown at step 334.

At a successive time, the agent 145 receives a subsequent change set 165' having a subsequent validator 170, the subsequent validator indicative of a data set to which the subsequent change set applies, as shown at step 335. Similar to the above, the store process 145 compares the subsequent validator 170 to the stored validator 174, as shown at step 336. The store process 145 applies, if the subsequent validator 170 matches the stored validator 174, the subsequent change set to the stored data set, as depicted at step 337, and control reverts to processing as in step 331 for processing a subsequent series of change sets 165.

If the validators 170, 174 do not match, then the change set message 165' is out of synchronization with the data set currently stored in the managed object database. Accordingly, as depicted at step 338, the store process 145 does not apply, if the received validator does not correspond to the previous validator, the changes in the change set 165. The store process 145 may also perform the following: discarding, if the subsequent validator does not match the stored validator, the subsequent change set, as depicted at step 339, and requesting a full data set 165 including the remote data set 162 to which the change set applies 165', as shown at step 340. Control then reverts to step 331 as above for subsequent change set processing.

Full data set processing may also be employed as an error recovery measure. Since the agent 155 transmitting the data sets has access to the full data set as well as change sets, the store process 145 may invoke the agent to send the full data set upon an indication of irregularities processing the change set. Such irregularities may include errors in processing, network failure, catastrophic process failure, or other indications of possible inconsistency with change set processing. Error handling by requesting full data set processing in the event of irregularities is embedded in change set processing.

In such recovery or inconsistency scenarios, the requesting store process invalidates the current store validator V[S] 174 so as to force full data set processing. Such invalidation ensures that the change processing logic 176 concludes that change set processing is not appropriate, in the event that any of the validators 170, 172, 174 have an inconstant or unknown state following an unexpected processing irregularity.

Those skilled in the art should readily appreciate that the programs and methods for persisting management information changes, such as processing managed object database changes in a SAN as defined herein, are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for persisting management information changes has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A computer-implemented method for persisting management information changes received from a remote node in a storage area network (SAN) at a storage computer system in the SAN, the method comprising:
   receiving a change set from the remote node, the change set having changes to a stored data set;
   receiving a validator from the remote node, the validator computed at the remote node and indicative of a data set to which the change set is relative according to a value specific to at least a subset of selected values in the data set to distinguish the data set from other data sets having different values;
   comparing the received validator to a previous validator indicative of a present state of the stored data set;
   applying the changes in the received change set to the stored data set if the received validator corresponds to the previous validator; and
   ignoring the changes in the received change set if the received validator does not correspond to the previous validator.

2. The computer-implemented method of claim 1 wherein applying the change set to the stored data set further comprises:
   storing the corresponding validator with the stored data set;
   receiving a subsequent change set having a subsequent validator, the subsequent validator indicative of a data set to which the subsequent change set applies;
   comparing the subsequent validator to the stored validator; and applying, if the subsequent validator matches the stored validator, the subsequent change set to the stored data set.

3. The computer-implemented method of claim 1 further comprising:
   computing an update validator indicative of the applied change set; and
   storing the update validator as the current stored validator.

4. The computer-implemented method of claim 2 further comprising at least one of:
   discarding if the subsequent validator does not match the stored validator, the subsequent change set; and
   requesting a full data set from a remote data set to which the change set applies.

5. The computer-implemented method of claim 1 further comprising:
 computing the validator on a full data set at a remote node;
 transmitting the validator with the change set;
 identifying a delta threshold, the delta threshold indicative of a change set size imposing a computational intensity of greater magnitude than a corresponding full set update; and
 transmitting a full data set inclusive of the changes in the change set if the quantity of changes in the change set exceeds the identified delta threshold.

6. The computer-implemented method of claim 5 further comprising:
 identifying a partition threshold;
 computing, if the quantity of changes exceeds the partition threshold, a series of partitions, each of the partitions inclusive of related data items, the related data items corresponding to common objects such that the common objects comprise common updates for a plurality of changes in the data set; and
 transmitting each of the partitions.

7. The computer-implemented method of claim 5 wherein transmitting further comprises:
 computing a plurality of partitions inclusive of the entire data set; and
 transmitting each of the partitions.

8. The computer-implemented method of claim 1 further comprising:
 computing a validator on a full data set corresponding to a remote managed object;
 generating a change set indicative of changes to the full data set;
 transmitting the generated change set and the computed validator to a store process that maintains the full data set;
 comparing the computed validator to a previous validator corresponding to a previously generated change set;
 applying the generated change set if the computed validator corresponds to the validator indicative of the previously generated change set;
 storing the computed validator as the previous validator to compare with a successive change set; and
 wherein the full data set further comprises a series of partitions, computing the validator further comprising:
  computing the validator on the aggregate partitions;
  identifying a stored validator from a previous data set; and
  receiving each of the partitions in the full data set.

9. The computer-implemented method of claim 8 further comprising:
 transmitting a full data set having marked changes, the marked changes defining a change set;
 comparing the full data set to a delta threshold indicative of a maximum change set; and
 determining, based on the comparing, whether to apply the full data set or the marked changes.

10. The computer-implemented method of claim 8 wherein generating the change set occurs according to a data collection policy, the data collection policy indicative of time intervals for generating change sets, the method further comprising defining the time interval as a multiple of a time interval corresponding to other agents.

11. The computer-implemented method of claim 2 further comprising:
 building a full data set;
 for each entry in the full data set, marking the entry as changed or unchanged, the set of changed entries collectively defining a change data set;
 transmitting the built full data set; and
 applying, based on the comparing, at least one of the change sets defined by the marked changed entries or the full data set having all entries.

12. The computer-implemented method of claim 2 further comprising:
 detecting an irregularity in change set processing;
 requesting a full data set; and
 invalidating the current stored validator corresponding to the stored data set to ensure consistency of successive change set processing.

13. The computer-implemented method of claim 1, further comprising:
 computing the validator indicative of the data set from which the change set is derived, the validator being computed on a full data set by a remote agent at a remote node;
 wherein receiving the change set having changes to the stored data set includes the stored data set being derived from a storage array and the change set being received by a store process associated with a managed object database;
 wherein receiving the validator indicative of the data set to which the change set applies includes the validator being a mathematical quantity indicative of content of the stored data set, the validator being transmitted with the change set;
 wherein comparing the received validator to the previous validator includes the previous validator being stored with the full data set at the managed object database; and
 in response to identifying that the received validator does not match the previous validator, flagging an ordering of the data set and requesting transmission of a full data set.

14. The computer-implemented method of claim 13, further comprising:
 receiving multiple change sets corresponding to different full data sets;
 generating a change set indicative of changes to the full data set and according to a data collection policy, the data collection policy indicative of time intervals for generating change sets; and
 defining the time interval as a multiple of a time interval corresponding to other agents.

15. The computer-implemented method of claim 14, further comprising:
 subsequent to applying the changes in the change set to the stored data set, designating the received validator as a new previous validator for the stored data set having applied changes;
 identifying a delta threshold, the delta threshold indicative of a change set size imposing a computational intensity of greater magnitude than a corresponding full set update; and
 transmitting a full data set inclusive of the changes in the change set if the quantity of changes in the change set exceeds the identified delta threshold.

16. The computer-implemented method of claim 1, further comprising:
 wherein computing the validator includes computing a value specific to at least a subset of selected values in the data set to distinguish the data set from other data sets having different values;
 computing a validator on a full data set corresponding to a remote managed object;

generating a change set indicative of changes to the full data set; transmitting the generated change set and the computed validator to a store process that maintains the full data set;

comparing the computed validator to a previous validator corresponding to a previously generated change set;

applying the generated change set if the computed validator corresponds to the validator indicative of the previously generated change set; and storing the computed validator as the previous validator to compare with a successive change set.

17. The computer-implemented method of claim 15, wherein applying the change set to the stored data set further comprises:

storing the corresponding validator with the stored data set;

receiving a subsequent change set having a subsequent validator, the subsequent validator indicative of a data set to which the subsequent change set applies;

comparing the subsequent validator to the stored validator;

applying, if the subsequent validator matches the stored validator, the subsequent change set to the stored data set;

computing an update validator indicative of the applied change set; storing the update validator as the current stored validator;

detecting an irregularity in change set processing;

requesting a full data set; and invalidating the current stored validator corresponding to the stored data set to ensure consistency of successive change set processing.

18. A server for persisting management information changes from a remote node in a storage area network (SAN) comprising:

a processor; and a memory coupled to the processor, the memory storing instructions that when executed by the processor cause the server to perform the operations of:

receiving a change set from the remote node, the change set having changes to a stored data set;

receiving a validator from the remote node, the validator computed at the remote node and indicative of a data set to which the change set is relative according to a value specific to at least a subset of selected values in the data set to distinguish the data set from other data sets having different values;

comparing the received validator to a previous validator indicative of a present state of the stored data set;

applying the changes in the change set to the stored data set if the received validator corresponds to the previous validator; and ignoring the changes in the change set if the received validator does not correspond to the previous validator.

19. A computer-implemented method of coalescing management information changes reported to a database, the method comprising:

computing a validator corresponding to a full data set indicative of information on a storage array to which the change set is relative according to a value specific to at least a subset of selected values in the data set to distinguish the data set from other data sets having different values;

generating a first change set of data corresponding to changes to the full data set;

transmitting the first change set and the computed validator to a database store process to maintain the full data set, record the first change set by applying the changes in the received first change set to the full data set in the database if the received validator corresponds to the previous validator and record the computed validator as relative to the full data set, and ignore the changes in the received first change set if the received validator does not correspond to the previous validator;

generating a second change set at a subsequent time corresponding to subsequent changes to the full data set;

transmitting the second change set with a most recent validator to the database stored process to compare the most recent validator with the recorded computed validator, determine the existence of a correspondence between the most recent validator and the recorded computed validator, the correspondence indicative of both the first change set and the second change set being relative to the same full data set, apply the second change set to the current full data set stored in the database if a correspondence between the most recent validator and the recorded computed validator exists, and if a correspondence between the most recent validator and the recorded computed validator does not exist, perform at least one of:

discarding the second change set as out of synchronization with the current full data set; and requesting a full data set indicative of the information on the storage array.

20. A computer program product having a non-transitory computer readable storage medium that stores computer program logic embodied in computer program code encoded thereon for persisting continually changing management information receivable from a remote node in a storage area network (SAN) comprising:

computer program code for receiving a change set from the remote node, the change set having changes to a stored data set;

computer program code for receiving a validator from the remote node, the validator computed at the remote node and indicative of a data set to which the change set is relative according to a value specific to at least a subset of selected values in the data set to distinguish the data set from other data sets having different values;

computer program code for comparing the received validator to a previous validator indicative of a present state of the stored data set;

computer program code for applying the changes in the change set to the stored data set if the received validator corresponds to the previous validator, computer program code for applying the change set to the stored data set further comprising:

computer program code for storing the validator with the stored data set;

computer program code for receiving a subsequent change set having a subsequent validator, the subsequent validator indicative of a data set to which the subsequent change set applies;

computer program code for comparing the subsequent validator to the stored validator;

computer program code for applying the subsequent change set to the stored data set if the subsequent validator matches the stored validator; and computer program code for ignoring the changes in the change set if the received validator does not correspond to the previous validator.

* * * * *